(12) United States Patent
Albert et al.

(10) Patent No.: US 8,925,946 B2
(45) Date of Patent: Jan. 6, 2015

(54) VEHICLE COMPRISING AT LEAST TWO AXLES AND METHOD FOR DISTRIBUTING THE LOAD BETWEEN SAID AT LEAST TWO AXLES

(75) Inventors: Loic Albert, Clermont-Ferrand (FR); Fabien Marlier, Clermont-Ferrand (FR); Philippe Mansuy, Cebazat (FR)

(73) Assignees: Michelin Recherche et Techniques S.A., Granges-Paccot (CH); Compagne Generale des Establissements Michelin, Clermont-Ferrand (FR)

( * ) Notice: Subject to any disclaimer, the term of this patent is extended or adjusted under 35 U.S.C. 154(b) by 179 days.

(21) Appl. No.: 13/388,044

(22) PCT Filed: Jul. 6, 2010

(86) PCT No.: PCT/EP2010/059604
§ 371 (c)(1),
(2), (4) Date: Apr. 13, 2012

(87) PCT Pub. No.: WO2011/012407
PCT Pub. Date: Feb. 3, 2011

(65) Prior Publication Data
US 2012/0187656 A1    Jul. 26, 2012

(30) Foreign Application Priority Data
Jul. 29, 2009   (FR) ..................... 09 55306

(51) Int. Cl.
*B60G 9/04* (2006.01)
*B60G 17/018* (2006.01)
*B60G 17/016* (2006.01)
*B62D 53/06* (2006.01)

(52) U.S. Cl.
CPC ........ *B62D 53/068* (2013.01); *B60G 2800/214* (2013.01); *B60G 2800/915* (2013.01); *B60G 2800/24* (2013.01); *B60G 2500/201* (2013.01); *B60G 2400/824* (2013.01); *B60G 2300/042* (2013.01); *B60G 17/018* (2013.01); *B60G 17/0162* (2013.01); *B60G 2300/0262* (2013.01); *B60G 2400/208* (2013.01); *B60G 2202/152* (2013.01)
USPC ................. 280/124.157; 180/24.02; 280/86.5

(58) Field of Classification Search
USPC .......... 180/24.02, 209; 280/5.5, 5.514, 6.157, 280/6.159, 124.157, 86.5
See application file for complete search history.

(56) References Cited

U.S. PATENT DOCUMENTS 3,494,632 A * 2/1970 Bostrom ................. 280/683
4,854,407 A * 8/1989 Wagner ................. 177/141
(Continued)

FOREIGN PATENT DOCUMENTS

| EP | 1852284 A1 * | 11/2007 |
|---|---|---|
| EP | 2 075 143 | 7/2009 |
| WO | WO 2006/054940 | 5/2006 |
| WO | WO 2007/050014 | 5/2007 |

*Primary Examiner* — Paul N Dickson
*Assistant Examiner* — Robert A Coker
(74) *Attorney, Agent, or Firm* — Cozen O'Connor

(57) ABSTRACT

A vehicle (3) comprising at least two axles (6, 7, 8) fitted with at least two tires the axis of rotation of which are always mutually parallel from one axle to another. Each axle (6, 7, 8) bears at least 10% of the load of the vehicle and at least two axles (6, 7, 8) bear different loads during running. Also disclosed is a method for distributing the load between said at least two axles.

16 Claims, 2 Drawing Sheets

(56) References Cited

U.S. PATENT DOCUMENTS

| | | | |
|---|---|---|---|
| 5,025,877 A * | 6/1991 | Assh | 180/24.02 |
| 5,630,625 A * | 5/1997 | Shaw | 280/838 |
| 6,203,045 B1 * | 3/2001 | Kyrtsos et al. | 280/405.1 |
| 6,240,339 B1 * | 5/2001 | von Mayenburg et al. | 701/1 |
| 6,371,227 B2 * | 4/2002 | Bartlett | 180/24.02 |
| 6,499,552 B2 * | 12/2002 | Bell | 180/197 |
| 6,921,100 B2 * | 7/2005 | Mantini et al. | 280/407 |
| 8,424,892 B2 * | 4/2013 | Hapyuk et al. | 280/149.2 |
| 2004/0007840 A1 * | 1/2004 | Boisture et al. | 280/86.5 |
| 2009/0322048 A1 * | 12/2009 | Glavinic et al. | 280/86.5 |

* cited by examiner

VEHICLE COMPRISING AT LEAST TWO AXLES AND METHOD FOR DISTRIBUTING THE LOAD BETWEEN SAID AT LEAST TWO AXLES

RELATED APPLICATIONS

This is a U.S. national stage under 35 USC §371 of application No. PCT/EP2010/059604 filed on Jul. 6, 2010.

This application claims the priority of French application no. 09/55306 filed Jul. 29, 2009, the entire content of which is hereby incorporated by reference.

FIELD OF THE INVENTION

The invention relates to a vehicle such as a transport vehicle of the heavy goods type, comprising at least two axles, none of them being a steered axle, and to a method of distributing the load of said vehicle.

Although not limited to this type of application, the invention will be more particularly described with reference to a vehicle of the trailer or semi-trailer type comprising three axles, each fitted with at least two tires.

BACKGROUND OF THE INVENTION

The circumferential direction of the tire, or longitudinal direction, is the direction corresponding to the periphery of the tire and defined by the direction in which the tire runs.

The transverse or axial direction of the tire is parallel to the axis of rotation of the tire.

The radial direction is a direction that intersects the axis of rotation of the tire and is perpendicular thereto.

The axis of rotation of the tire is the axis about which it revolves in normal use.

A radial or meridian plane is a plane containing the axis of rotation of the tire.

A circumferential plane is a plane perpendicular to the axis of rotation of the tire.

The circumferential median plane, or equatorial plane, is a plane perpendicular to the axis of rotation of the tire and which splits the tire into two halves.

Such vehicles, generally intended to carry heavy loads, need to meet certain requirements regarding in particular the longitudinal spacing between each of the axles. Specifically, the various sets of regulations dictate longitudinal distances between two axles of a trailer that has three axles, according to the permissible load for said vehicle. This is usually a distance of 1.3 meters for trailers comprising three axles. Moreover, current market trends for these trailers is towards a standardization of the design of these trailers and particularly towards equipping them with a given and the same tire for all of the axles.

The way in which such three-axle trailers are used has an effect notably on tire wear. Specifically, when the vehicle follows a straight-line path, for example on a road or a motorway, all of the tires with which the trailer is fitted experience substantially equivalent conditions. However, as soon as the trailer follows a curved path, such as on a roundabout for example or during maneuvering, the tires are no longer loaded in the same way. These differences in load generate highly variable levels of wear on the various tires with which the trailer is fitted, making tire management in particular complicated. It also entails the provision of tires that can meet the most severe tire wear conditions and therefore tires that have a sufficient depth of tread. This of course makes the design of the tire more complicated, because the mass of rubber is not favorable to tire durability because it leads to increases in tire temperature during running.

First of all, notably as a function of speed, running along a curved path leads to load being transferred onto the tires that are on the outside of the bend, and therefore to greater wear thereof.

Secondly, some of the tires fitted to the three axles experience phenomena of scrubbing against the ground, which accentuates the wearing of the tires affected by these phenomena. Indeed it is known that when the vehicle is fitted with three axles, each fitted with at least two tires, not all of the tires are able to follow a curved path corresponding to the path followed by the vehicle. When the spacing between the axles is even, if the tires fitted to the intermediate axle follow a path substantially equivalent to that of the vehicle, the tires fitted to the other two axles experience phenomena of scrubbing against the ground, leading to greater tire wear.

It is clear from this usage that the tire wear of tires fitted to such a vehicle is uneven, and dependent on whereabouts on the trailer the tire is fitted, even though the tires are usually all the same.

Further, changes to road layouts, notably with a view to improving the safety of road users, has led to a proliferation of roundabouts and therefore to a not-insignificant increase in the causes that lead to differential tire wear across the tires with which a trailer is fitted.

The current state of affairs means that uneven tire wear on a trailer comprising three axles is becoming troublesome to the user who too often has to lay up his vehicle to remedy this, either by swapping the tires around or by changing them.

Document FR 2 903 953 or even document EP 1 640 247 propose solutions consisting in self-steering axles which work by passive or even active steering of the axles of a trailer. While these technologies provide solutions to the scrubbing problem or to the problem of differential tire wear, they are, on the other hand, difficult and expensive to implement. Further, because of their complexities, these technologies are operational only during maneuvering.

There are also available on the market such trailers in which one or more axles can be raised up to eliminate contact between the tires with which these axles are fitted and the ground. These raisable axles of course avoid tire wear for the tires concerned when they are in the raised position, but this status can be maintained only as long as the load being carried is below the maximum possible load.

SUMMARY OF THE INVENTION

One object of the present invention is to improve the tire wear of a vehicle comprising at least two axles, none of them being a steered axle, and more specifically of reducing the uneven rate of wear between the various tires, notably when driving along a curved path or during maneuvering.

This object has been achieved according to one aspect of the invention by a vehicle comprising at least two axles fitted with at least two tires the axis of rotation of which are always mutually parallel from one axle to another, each axle bearing at least 10% of the load of the vehicle and at least two axles bearing different loads during running.

Advantageously according to an embodiment of the invention, the at least two axles are not driven axles.

According to one preferred embodiment of the invention, at least one axle bears a load at least 15% greater than the load borne by another axle.

The inventors have been able to demonstrate, notably in the case of trailers comprising three axles, that a different distribution of load across the axles can contribute to evening out the rate of tire wear when negotiating roundabouts or during maneuvering. More specifically, the rate of wear of the tires with which the front and rear axles are fitted is reduced.

Vehicles, and, notably, trailers comprising three axles, are nowadays increasingly being fitted with suspension of the air suspension type. At the present time, the suspension air springs are all at the same pressure. A modification to the air spring pressure management device, which is within the competence of the person skilled in the art, for example using electrically operated valves, may allow the air springs to be given pressures that differ from one another and therefore differ from one axle to another. Such a modification to the pressure of the suspension air springs allows a different load distribution between at least two axles to be achieved.

According to one embodiment of the invention, the pressure in the various suspension air springs can be managed immediately after the vehicle has been loaded and the setting maintained throughout the driving of this vehicle. This embodiment is most particularly suited to the case of vehicles that run around carrying loads lower than their maximum load capacity. This is because the loss in terms of the behavior of the tires fitted to the axles the load of which has been lightened has no impact in as much as the vehicle is loaded to below its maximum load capacity. This is because the tire behavior required for driving the vehicle, notably in terms of cornering stiffness, can be obtained with only the tires of two axles, or even of just one axle depending on the load being transported, the tires being dimensioned for the maximum load of the vehicle.

The inventors have also demonstrated that in most cases the vehicles are not used at their maximum load and that accordingly this first embodiment is satisfactory in very many cases.

According to another embodiment of the invention, this management of the pressure in the suspension air springs is done in real time so as not to penalize straight-line running and to introduce loads that differ between at least two axles only under cornering corresponding to roundabouts or maneuvering phases.

In order to carry out such real-time pressure management, it is possible to provide a manual control operated by the driver which will allow a transition from a status in which the pressures in all the suspension air springs are identical, the said status being suited to driving along a main road or motorway, to another status in which the pressures in at least two suspension air springs are different.

Another way of effecting this real-time management may be to use a microprocessor on the basis of data measured on the vehicle. For example, it is possible to use data accessible in the antilock braking systems associated with each of the wheel. Specifically, these systems provide precise data regarding the rotational speeds of each of the wheels and from this it is therefore possible to deduce firstly the speed of the vehicle, by averaging the various speeds and secondly, the turn radius followed, if there is one, by determining the differences between the speeds of the wheels of one and the same axle.

It is also possible to achieve different load distributions between at least two axles by providing suspension air springs of different sizes on at least one axle. In such embodiments, the different load distributions are maintained throughout driving.

Tests carried out on a route combining main road, urban and parking-area driving to simulate average standard use have demonstrated that a vehicle according to the invention is able to achieve a more even wear rate across all the tires of the vehicle as compared with the wear rate of tires fitted to a similar vehicle in which the load is distributed equally over all the axles.

According to a first alternative form of embodiment of the invention, with the said vehicle comprising three axles, at least two axles bear identical loads. Advantageously according to the invention, the load borne by the intermediate axle is different from that of the other axles in order best to limit the phenomena of tire scrub for the tires fitted to the other axles.

According to other alternative forms of embodiment of the invention, with the said vehicle comprising three axles, each axle bears a different load. According to this type of alternative form of embodiment, the choice of distribution will be made as a function of the various parameters of the vehicle, such as the size, the spacing between the axles, the load being transported, etc.

According to either one of these alternative forms of embodiment of the invention, the load borne by the intermediate axle is advantageously greater than those of the other axles. The intermediate axle advantageously bears a load that is greater than the loads borne by the other two axles so as best to limit the phenomena of tire scrub for the tires fitted to these two front and rear axles either when negotiating roundabouts or during maneuvering.

According to a preferred embodiment of the invention, the load borne by the intermediate axle is comprised between 35 and 70% of the load of the vehicle.

For preference also, the load borne by the front axle and/or the rear axle is comprised between 10 and 33% of the load of the vehicle.

Lightening the load borne by the tires of the front axle also makes it possible to limit the extent to which these tires are damaged in impacts, for example, with curbs. Specifically, it is the tires of the front axle that potentially come into contact with said curbs when maneuvering and negotiating roundabouts.

The inventors have also been able to demonstrate that the vehicle according to the invention can be operated without any alteration to the tires customarily used.

Specifically, at the present time, the tires mainly used on trailers comprising three axles are of the 385/65R22.5 type. Such tires have a load bearing capability of 4.5 tonnes, in accordance with the definitions laid down by the ETRTO. Moreover, certain legislation regarding trailers has for example set a maximum trailer load at 24 tonnes. From these figures it is clear than even when the trailer is at maximum load, the six tires fitted to the three axles still have additional capacity with regard to the load being transported. Indeed in theory, these six tires could support a load of 27 tonnes.

It is therefore possible, in such cases, to apply the invention to such a trailer fitted with these tires by, for example, having each of the tires of the intermediate axle bear a load of 4.5 tonnes and each of the other tires bear a load of 3.75 tonnes.

The invention will work all the better when the vehicles are running with loads below the maximum possible loads.

It is of course still possible, according to other forms of embodiment of the invention, to combine the vehicle with tires that are different from those customarily used, capable for example of bearing a higher load so as to allow the intermediate axle to bear a higher load than can be borne with the tires described hereinabove.

The invention also makes provision for the various axles to be able to be fitted with different tires, notably having different loading capacities, so as to provide different loading capacities between at least two axles.

When the invention is applied to vehicles each of the axles of which is fitted with braking devices with antilock braking systems on each axle, braking can be performed effectively.

There are still vehicles that have just one antilock braking system operating all of the braking devices of the various axles. With this type of vehicle, it is necessary to slave the actions connected with the antilock braking system to suit the load being carried by each of the axles. For example, it is within the competence of a person skilled in the art to connect these actions to the pressure of the suspension air springs.

Another aspect of the invention is directed to a method for distributing the load of a vehicle between several axles of said vehicle, the axis of rotation of said axles being permanently parallel to one another from one axle to another, whereby the vehicle load is distributed between the various axles according to the use being made of said vehicle.

Within the context of the invention, what is meant by the use being made of the vehicle is either the load being transported or the type of driving being undertaken (driving on a main road, maneuvering or driving in an urban zone), or even a combination of these two features. In other words, the load distribution provided by the invention is dependent on the load being transported and/or on the type of driving being undertaken.

According to one preferred embodiment of the invention, with the vehicle being equipped on each of the axles with suspension of the suspension air spring type, the air pressure in the air springs of each of the axles is adapted to suit the use being made of the vehicle.

As explained previously, as soon as the vehicle is following a curved path like that of a roundabout or during maneuvering, the air pressure in the air springs of each of the axles is modified in order to distribute the load differently between the axles.

For preference also according to the invention, the air pressure applied to the suspension air spring of one axle is at least 15% higher than that in the suspension air spring of another axle.

According to a first alternative form of embodiment of the invention, with the vehicle comprising three axles, at least two axles always have the same air spring air pressure.

According to a second alternative form of embodiment of the invention, with said vehicle comprising three axles, each axle, at least during a given use, has a different air spring air pressure.

According to either one of these alternative forms of embodiment of the invention, the air pressure in the suspension air spring of the intermediate axle is higher than that of the other axles.

BRIEF DESCRIPTION OF THE INVENTION

DETAILED DESCRIPTION OF THE INVENTION

Figure 1:
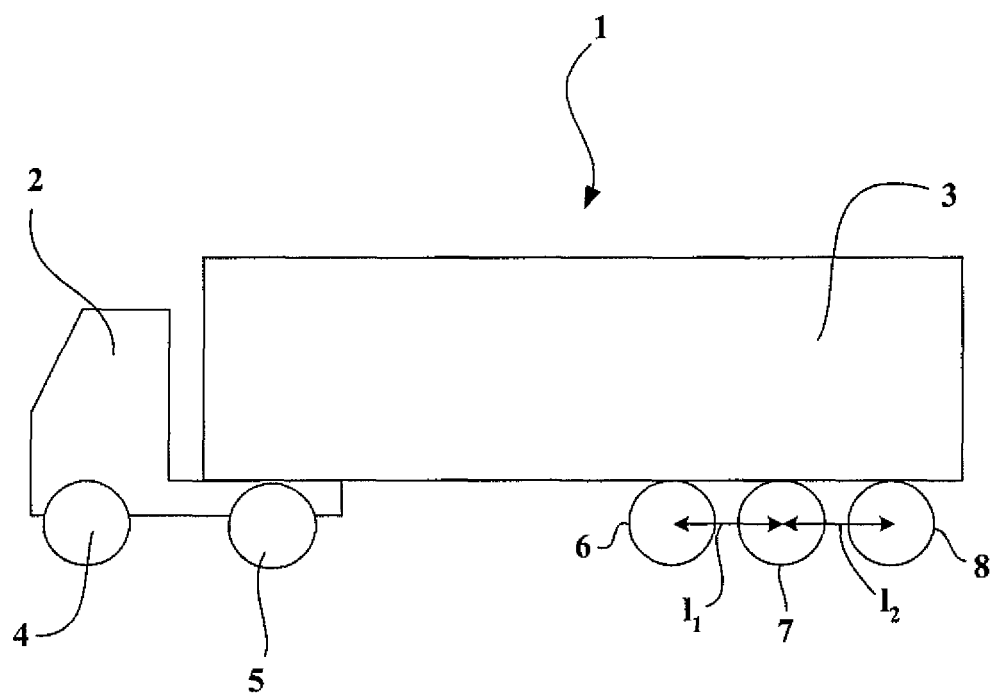
FIG. 1 is a diagram of a vehicle comprising a trailer with three axles.

To make it easier to understand, FIG. 1 is not drawn to scale.

FIG. 1 schematically depicts a vehicle 1 consisting of a tractor 2 and of a trailer 3.

The tractor 2 comprises a steered first axle 4 and a driven second axle 5. The trailer 3 comprises three bearing axles 6, 7, 8. These three axles 6, 7, 8 are neither steered nor driven. The spacings or wheel bases 11 and 12 between the three axles 6, 7, 8 are equal to 1.3 meters.

The overall laden weight of the vehicle 1 is equal to a maximum of 40 tonnes, which corresponds to a maximum transported load of 24 tonnes.

The tires fitted to the tractor 2 are of the 315/70R22.5 type and those fitted to the axles 6, 7, 8 of the trailer 3 are of the 385/65R22.5 type.

The distribution of weight across the various axles when the vehicle 1 is at its maximum load, this load being distributed evenly across the trailer 3 is as follows:
axle 4: 6.6 tonnes
axle 5: 11.8 tonnes
axles 6, 7 and 8: 21.6 tonnes Each of the axles 6, 7, 8 is associated with a suspension, not depicted in the figure, of the air suspension type, the pressure of the air spring of which can be adjusted for each of the axles.

According to the invention, the vehicle 1 is equipped with a system that allows the pressure of each of the suspension air springs to be modified according to the load being transported and possibly, depending on the circumstances, according to the route being followed by the vehicle. This regulation of the pressures is, for example, achieved using electrically operated valves associated with each of the air circuits of the various axles 6, 7, 8.

According to the invention, when the load being transported is not at its maximum and/or approaching roundabouts or during maneuvering, the load borne by the axles 6, 7 and 8 varies between at least two of said axles.

The load is preferably greater on the axle 7 so as to limit tire wear on the axles 6 and 8 when these are caused to scrub against the ground when the vehicle 1 is negotiating roundabouts or during maneuvering.

Tests have thus been carried out with the vehicle 1, this vehicle transporting a load of 24 tonnes, with 21.6 tonnes being borne by the three axles of the trailer, as explained before, on the one hand, with identical pressures in each of the suspension air springs, as in conventional vehicles, the load borne by each of the axles being equal to 7.2 tonnes. Further, on the other hand, the same tests were carried out with a vehicle 1 in which the air pressures in each of the suspension air springs were set according to the invention so that the axle 7 was bearing a load of 9 tonnes and the axles 6 and 8 were each bearing a load of 6.3 tonnes. In both instances, the tires fitted to the three axles of the trailer were the same.

First tests, simulating tire wear due to driving in urban environments comprising roundabouts, were carried out on a track that imposed turn radii ranging from 30 to 240 meters, with a standard deviation on curvature of 0.0087 $m^{-1}$, at speeds ranging from 20 to 50 km/h, such that the standard deviation on transverse acceleration was 0.47 $m/s^2$.

The test involved driving the vehicle for 250 hours and characterizing the absolute tire wear by measuring the lost tire material in grams per 100 km for each of the tires fitted to the three axles of the trailer and by averaging these tire wears across the two tires fitted to one and the same axle.

The results are recorded in the table below:

|  | Axle 1 | Axle 2 | Axle 3 |
| --- | --- | --- | --- |
| Reference vehicle (g/100 km) | 12.4 | 2.95 | 43.7 |
| Vehicle according to the invention (g/100 km) | 10.4 | 3.77 | 40.2 |

Second tests, simulating tire wear due to driving also including maneuvering, were carried out on a track imposing turn radii ranging from 16 to 240 meters, with a standard deviation on curvature of 0.0097 m$^{-1}$, at speeds ranging from 5 to 50 km/h, such that the standard deviation on transverse acceleration was 0.47 m/s$^2$.

The test involved driving the vehicle for 250 hours and characterizing the absolute tire wear by measuring the lost tire material in grams per 100 km for each of the tires fitted to the three axles of the trailer and by averaging these tire wears across the two tires fitted to one and the same axle.

The results are recorded in the table below:

|  | Axle 1 | Axle 2 | Axle 3 |
|---|---|---|---|
| Reference vehicle (g/100 km) | 20.9 | 2.97 | 49.2 |
| Vehicle according to the invention (g/100 km) | 17.6 | 3.75 | 45.24 |

In both instances the results obtained show that the vehicle according to the invention makes it possible to reduce tire wear on the tires fitted to the front and rear axles of the trailer. The second test demonstrates that tire wear due to scrubbing during maneuvering is also improved.

A third type of test involved running two identical vehicles, one of them being a vehicle according to vehicle 1 according to the invention, on identical routes representative of a conventional type of use for lorries carrying goods. The test involved determining the life of the tires on each of the axles, this tire life being expressed in the number of kilometers covered before the tire became completely worn (as indicated by the wear indicators).

The results are recorded in the table below:

|  | Axle 1 | Axle 2 | Axle 3 |
|---|---|---|---|
| Reference vehicle | 267000 km | 455000 km | 92000 km |
| Vehicle according to the invention | 308000 km | 362000 km | 103000 km |

While it might appear that improvements are obtained only on the two axles 1 and 3 which are subjected to the scrubbing phenomenon, the not-as-good performance of the tires fitted to axle 2 is of lesser importance in the light of the distances covered by these tires. Further, common practice is for the tires of this axle to be swapped around, fitting them to the other axles in order to even out tire wear.

Figure 2:
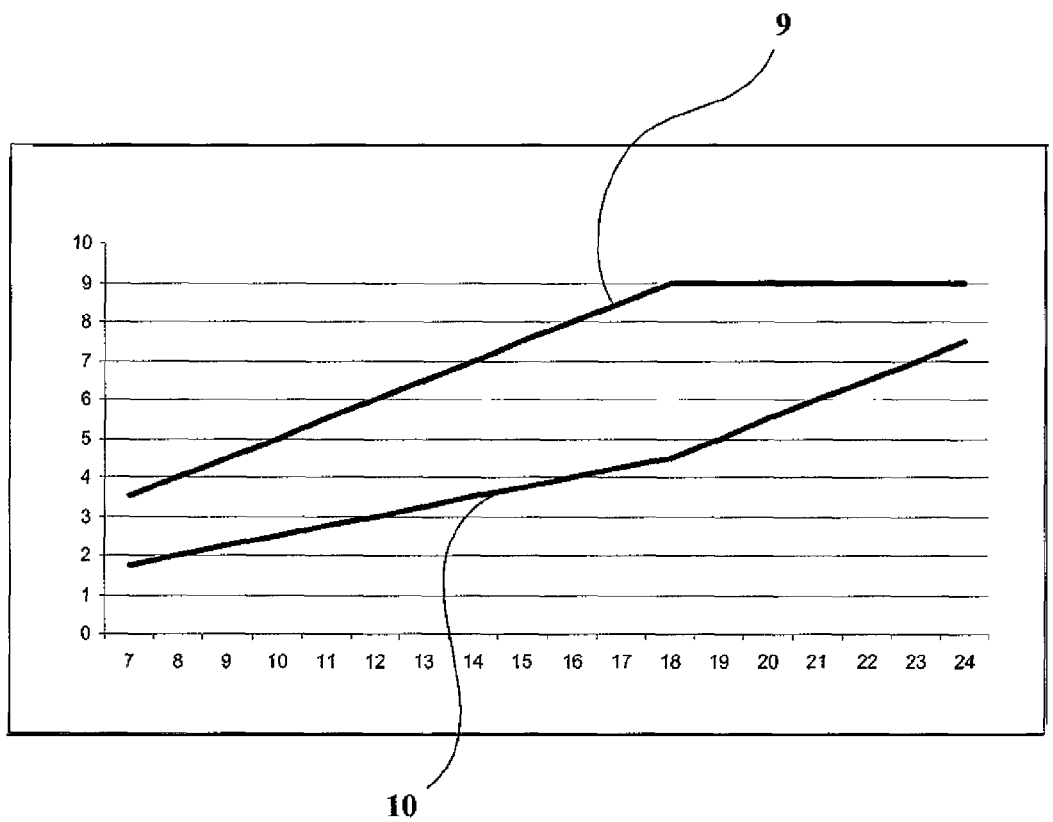
FIG. 2 is a schematic depiction of a control law for adapting the load per axle of a vehicle to suit the load being transported by said vehicle.

FIG. 2 is a graph showing one example of a control law for the load borne by each of the axles as a function of the overall load being transported and borne by the three axles 6, 7 and 8 of the trailer 3 of the vehicle 1.

In this example, curve 9 represents the load borne by the axle 7, the maximum load that this axle can bear being 9 tonnes.

Curve 10 represents the load borne by each of the axles 6 and 8.

According to the invention, knowing the overall load being transported by the vehicle and borne by the three axles of the trailer 3, these curves make it possible to define the load that each of the axles 6, 7 and 8 must bear in order best to limit the phenomena of wear caused by the scrubbing of the tires of axles 6 and 8 when driving around roundabouts or during maneuvering. The load distribution can be obtained according to the invention by altering the pressures in each of the air springs of the suspensions of each axle, for example using systems of the electrically operated valve type. The pressures that correspond to the various loads that are to be borne by the various axles are determined beforehand.

As explained previously, this state whereby the loads borne by the three axles 6, 7 and 8 are different can be applied permanently when the vehicle 1 is transporting a load that is relatively light in comparison with the maximum load that it could transport.

By contrast, it is applied only temporarily when driving through town or during maneuvers when the vehicle 1 is transporting a greater load notably one close or equal to the maximum load that it can transport. In order for this state to be applied only temporarily, the driver of the vehicle may have a manual control that allows him to switch from a mode of operation in which the loads borne by the axles 6, 7 and 8 are identical to a state in which the loadings of the various axles are differentiated according to the control law as described. It is even possible to conceive of switching from one state to the other automatically, it being possible for the type of driving to be analyzed notably on the basis of the speed of each of the six wheels of the three axles 6, 7 and 8.

This FIG. 2 of course merely illustrates one example of a control law for controlling the loads per axle; it is possible to conceive of different laws, notably based on the type of or types of tire fitted to the three axles 6, 7 and 8. It is even possible to conceive of having different loads between each of the axles 6, 7 and 8.

The invention has essentially been described with reference to trailers comprising three axles forming part of five-axle vehicles. The invention also makes it possible to reduce tire wear on trailers with two axles, forming part of three-axle or five-axle vehicles or alternatively of trailers with two or three axles associated with vehicles of up to eight axles for weights ranging up to as much as 60 tonnes.

The invention also applies to vehicles which, on the same axles, combine a distribution of load per axle according to the invention with axles that could potentially be raised when no load is being transported.

The invention claimed is:

1. A vehicle comprising at least three non-steered axles, each fitted with at least two tires, each axis of rotation of the at least three non-steered axles being always mutually parallel from one axle to another, wherein each axle bears at least 10% of the load of the vehicle, wherein at least two of the non-steered axles bear different loads during vehicle travel, and wherein the load borne by an intermediate non-steered axle is higher than that of the other non-steered axles, the intermediate non-steered axle being positioned between the other non-steered axles.

2. A vehicle according to claim 1, wherein at least one axle bears a load at least 15% greater than the load borne by another axle.

3. A vehicle according to claim 1, wherein at least two axles bear identical loads.

4. A vehicle according to claim 1, wherein each axle bears a different load.

5. A vehicle according to claim 1, wherein the load borne by the intermediate axle is comprised between 35 and 70% of the sum of the load borne by the three axles.

6. A vehicle according to claim 1, wherein the load borne by a front axle and/or a rear axle, of the at least three non-steered axles, is comprised between 10 and 33% of the sum of the load borne by the three axles.

7. A vehicle according to claim 1, wherein the at least three non-steered axles are non-driven axles.

8. A vehicle according to claim 1, wherein a distance between the intermediate non-steered axle and each of the other non-steered axles is less than or equal to 1.3 m.

9. A method for distributing the load of a vehicle between at least three non-steered axles of said vehicle, each axis of rotation of the at least three non-steered axles being permanently parallel to one another from one axle to another, wherein the vehicle load is distributed between the at least three non-steered axles according to at least one of a load condition and a driving condition, and wherein the load borne by an intermediate non-steered axle is higher than that of the other non-steered axles, the intermediate non-steered axle being positioned between the other non-steered axles.

10. The method according to claim 9, wherein the vehicle is equipped on each of the axles with suspension air springs, wherein the air pressure in the suspension air springs of each of the axles is adapted to effect the distribution of the vehicle load.

11. The method according to claim 10, wherein the air pressure applied to the suspension air spring of one axle is at least 15% higher than that in the suspension air spring of another axle.

12. The method according to claim 10, wherein at least two axles always have the same air spring air pressure.

13. The method according to claim 12, wherein the air pressure in the suspension air spring of the intermediate axle is higher than that of the other axles.

14. The method according to claim 10, wherein each axle, at least during a given use, has a different air spring air pressure.

15. The method according to claim 9, wherein the at least three non-steered axles are non-driven axles.

16. The method according to claim 9, wherein a distance between the intermediate non-steered axle and each of the other non-steered axles is less than or equal to 1.3 m.

* * * * *